(12) United States Patent
Haubrich et al.

(10) Patent No.: US 9,544,699 B2
(45) Date of Patent: Jan. 10, 2017

(54) WIRELESS STREAMING TO HEARING ASSISTANCE DEVICES

(71) Applicant: Starkey Laboratories, Inc., Eden Prairie, MN (US)

(72) Inventors: Greg Haubrich, Eden Prairie, MN (US); Alexander Botz, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 34 days.

(21) Appl. No.: 14/274,381

(22) Filed: May 9, 2014

(65) Prior Publication Data

US 2015/0326984 A1 Nov. 12, 2015

(51) Int. Cl.
*H04R 25/00* (2006.01)
*H04B 7/06* (2006.01)
*H04B 7/10* (2006.01)

(52) U.S. Cl.
CPC .......... *H04R 25/554* (2013.01); *H04B 7/0613* (2013.01); *H04B 7/10* (2013.01); *H04R 25/552* (2013.01); *H04R 2225/55* (2013.01)

(58) Field of Classification Search
CPC ..... H04R 25/55; H04R 25/555; H04R 25/554; H04R 2225/51; H04R 2225/55; H04B 5/0006; H04B 7/0608
See application file for complete search history.

(56) References Cited

U.S. PATENT DOCUMENTS

| | | | |
|---|---|---|---|
| 6,058,197 A | 5/2000 | Delage | |
| 6,694,034 B2 | 2/2004 | Julstrom et al. | |
| 8,041,066 B2 | 10/2011 | Solum | |
| 8,041,227 B2 | 10/2011 | Holcombe et al. | |
| 8,169,938 B2 | 5/2012 | Duchscher et al. | |
| 8,194,902 B2 | 6/2012 | Pedersen | |
| 8,229,146 B2 | 7/2012 | Nielsen | |
| 8,422,705 B2 | 4/2013 | Kilsgaard | |
| 8,442,248 B2 | 5/2013 | Solum et al. | |

(Continued)

FOREIGN PATENT DOCUMENTS

| | | |
|---|---|---|
| EP | 1867207 A1 | 12/2007 |
| EP | 1867207 B1 | 8/2008 |

(Continued)

OTHER PUBLICATIONS

"European Application Serial No. 15166849.8, Extended European Search Report mailed Sep. 30, 2015", 7 pgs.

(Continued)

*Primary Examiner* — Matthew Eason

(74) *Attorney, Agent, or Firm* — Schwegman Lundberg & Woessner, P.A.

(57) ABSTRACT

Disclosed in some examples are methods, systems, apparatus, and machine readable mediums which mitigate multipath fading and extend the robustness and the useable range of the wireless link between a streaming device and a hearing assistance device. In some examples, this may be accomplished by utilizing redundant wireless sources of the streaming data—that is, multiple copies of the streaming information may be sent to the hearing assistance devices. To prevent interference, at least one transmission parameter may be varied between the transmissions (e.g., frequency, channel, time, coding, or the like).

28 Claims, 6 Drawing Sheets

(56) References Cited

U.S. PATENT DOCUMENTS

| | | | |
|---|---|---|---|
| 8,571,241 B2 | 10/2013 | Larsen | |
| 8,686,855 B2 | 4/2014 | Popovski | |
| 8,712,083 B2 | 4/2014 | Solum | |
| 2002/0044661 A1 | 4/2002 | Jakobsson et al. | |
| 2002/0071435 A1 | 6/2002 | Bolgiano et al. | |
| 2003/0004821 A1 | 1/2003 | Dutta et al. | |
| 2005/0100182 A1 | 5/2005 | Sykes | |
| 2005/0169487 A1 | 8/2005 | Soede et al. | |
| 2007/0009124 A1 | 1/2007 | Larsen | |
| 2007/0249288 A1 | 10/2007 | Moallemi et al. | |
| 2007/0269065 A1 | 11/2007 | Kilsgaard | |
| 2007/0287386 A1 | 12/2007 | Agrawal et al. | |
| 2008/0146152 A1 | 6/2008 | Hulvey et al. | |
| 2008/0159548 A1 | 7/2008 | Solum | |
| 2008/0240440 A1 | 10/2008 | Rose et al. | |
| 2009/0154739 A1 | 6/2009 | Zellner | |
| 2009/0238375 A1* | 9/2009 | Pilati | H04L 1/004 381/79 |
| 2009/0296967 A1 | 12/2009 | Mullenborn et al. | |
| 2010/0054512 A1* | 3/2010 | Solum | H04R 25/554 381/315 |
| 2010/0086154 A1 | 4/2010 | Frerking et al. | |
| 2011/0249842 A1 | 10/2011 | Solum et al. | |
| 2012/0002830 A1 | 1/2012 | Solum | |
| 2012/0087505 A1* | 4/2012 | Popovski | H04L 1/18 381/23.1 |
| 2012/0121094 A1 | 5/2012 | Solum | |
| 2012/0121095 A1 | 5/2012 | Popovski et al. | |
| 2012/0269076 A1* | 10/2012 | Lenaerts | H01Q 21/28 370/252 |
| 2012/0308034 A1 | 12/2012 | El-Hoiydi | |
| 2012/0314890 A1 | 12/2012 | El-hoiydi et al. | |
| 2013/0182650 A1 | 7/2013 | Kezys et al. | |
| 2013/0251180 A1 | 9/2013 | Solum | |
| 2013/0254050 A1 | 9/2013 | Zhu et al. | |
| 2014/0023216 A1 | 1/2014 | Solum et al. | |
| 2014/0056451 A1 | 2/2014 | El-hoiydi et al. | |
| 2014/0064528 A1 | 3/2014 | Flood et al. | |
| 2014/0105396 A1 | 4/2014 | Engelien-Lopes | |
| 2014/0169599 A1 | 6/2014 | Solum et al. | |
| 2014/0192988 A1 | 7/2014 | Solum | |
| 2014/0193007 A1 | 7/2014 | Solum | |
| 2015/0010179 A1 | 1/2015 | Solum et al. | |
| 2015/0124976 A1* | 5/2015 | Pedersen | H04R 25/552 381/23.1 |
| 2015/0319557 A1 | 11/2015 | El-hoiydi | |
| 2015/0326274 A1 | 11/2015 | Flood et al. | |
| 2016/0080877 A1* | 3/2016 | Holm | H04R 25/552 381/23.1 |

FOREIGN PATENT DOCUMENTS

| | | |
|---|---|---|
| EP | 2002689 B1 | 6/2010 |
| EP | 2200207 A1 | 6/2010 |
| EP | 2403273 A1 | 1/2012 |
| EP | 2439962 A2 | 4/2012 |
| EP | 2442456 A1 | 4/2012 |
| EP | 2456234 A1 | 5/2012 |
| EP | 2498514 A1 | 9/2012 |
| EP | 2534854 A1 | 12/2012 |
| WO | WO-2007121414 A2 | 10/2007 |
| WO | WO-2008151624 A1 | 12/2008 |
| WO | WO-2009126614 A1 | 10/2009 |
| WO | WO-2011098143 A1 | 8/2011 |

OTHER PUBLICATIONS

"U.S. Appl. No. 13/738,775, Advisory Action mailed Jun. 10, 2016", 5 pgs.

"U.S. Appl. No. 13/738,775, Advisory Action mailed Jun. 29, 2015", 3 pgs.

"U.S. Appl. No. 13/738,775, Final Office Action mailed Mar. 3, 2015", 12 pgs.

"U.S. Appl. No. 13/738,775, Final Office Action mailed Mar. 18, 2016", 13 pgs.

"U.S. Appl. No. 13/738,775, Non Final Office Action mailed Aug. 17, 2016", 12 pgs.

"U.S. Appl. No. 13/738,775, Non Final Office Action mailed Sep. 15, 2015", 11 pgs.

"U.S. Appl. No. 13/738,775, Non Final Office Action mailed Sep. 25, 2014", 11 pgs.

"U.S. Appl. No. 13/738,775, Response filed May 18, 2016 to Final Office Action mailed Mar. 18, 2016", 8 pgs.

"U.S. Appl. No. 13/738,775, Response filed Jun. 3, 2015 to Final Office Action mailed Mar. 3, 2015", 8 pgs.

"U.S. Appl. No. 13/738,775, Response filed Dec. 15, 2014 to Non Final Office Action mailed Sep. 15, 2014", 8 pgs.

"U.S. Appl. No. 13/738,775, Response filed Dec. 26, 2014 to Non Final Office Action mailed Sep. 25, 2014", 9 pgs.

"U.S. Appl. No. 13/738,793, Advisory Action mailed Dec. 10, 2015", 3 pgs.

"U.S. Appl. No. 13/738,793, Final Office Action mailed Jul. 1, 2015", 9 pgs.

"U.S. Appl. No. 13/738,793, Final Office Action mailed Aug. 22, 2016", 8 pgs.

"U.S. Appl. No. 13/738,793, Non Final Office Action mailed Mar. 10, 2016", 9 pgs.

"U.S. Appl. No. 13/738,793, Non Final Office Action mailed Dec. 29, 2014", 8 pgs.

"U.S. Appl. No. 13/738,793, Response filed Apr. 29, 2015 to Non Final Office Action mailed Dec. 29, 2014", 8 pgs.

"U.S. Appl. No. 13/738,793, Response filed Jun. 10, 2016 to Non Final Office Action mailed Mar. 10, 2016", 8 pgs.

"U.S. Appl. No. 13/738,793, Response filed Dec. 1, 2015 to Final Office Action mailed Jul. 1, 2015", 8 pgs.

"European Application Serial No. 14150821.8, Extended European Search Report mailed Apr. 14, 2014", 6 pgs.

"European Application Serial No. 14150843.2, Extended European Search Report mailed Apr. 8, 2014", 6 pgs.

* cited by examiner

WIRELESS STREAMING TO HEARING ASSISTANCE DEVICES

BACKGROUND

Modern hearing assistance devices may offer advanced features, such as the ability to play an audio stream wirelessly received from a streaming source on the hearing assistance devices audio reproduction circuitry (e.g., the speaker). Example streaming sources may include televisions, computers, MP3 players, cell phones, and the like. These features allow individuals with a hearing disability to better enjoy activities such as listening to television or music, exploring the internet, talking on a cellular phone, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
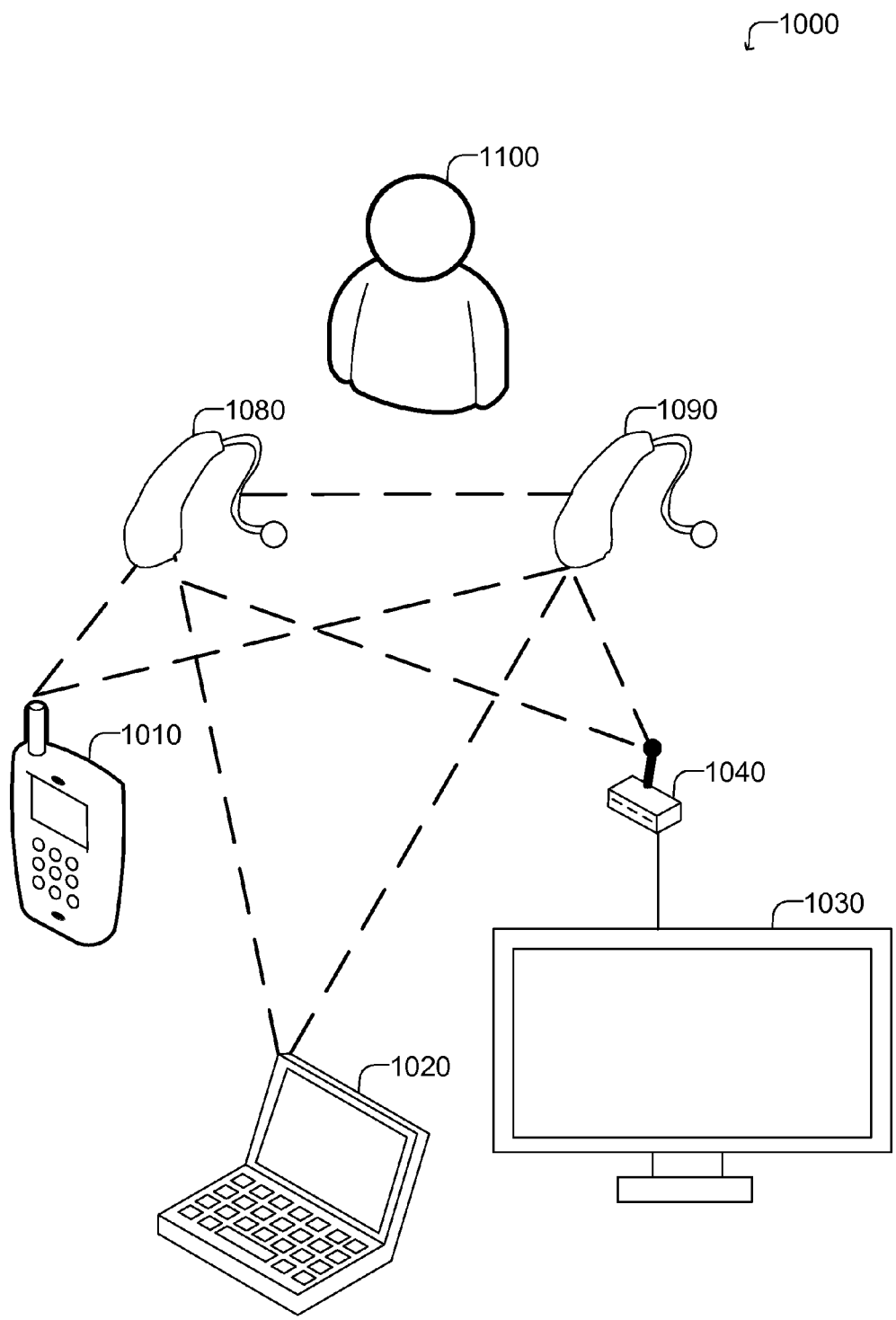
FIG. 1 shows one example schematic of a system for wirelessly streaming audio to one or more hearing assistance devices according to some examples of the present disclosure.

FIG. 1 shows one example schematic of a system 1000 for wirelessly streaming audio to one or more hearing assistance devices according to some examples of the present disclosure. Streaming audio is audio that is constantly received by and presented to an end-user, e.g., user 1100. Various audio streaming sources such as mobile phone (e.g., a smartphone) 1010, mobile computing devices 1020 (e.g., a laptop computer), a television 1030, or the like, are capable of communicating streaming audio to one or more hearing assistance devices 1080-1090 wirelessly. In some examples, the audio may be directly streamed by the devices 1010-1030, but in other examples, an audio output of the device (e.g., device 1030) may be connected to a streaming transmitter 1040, which may convert the audio output into a form suitable for wireless transmission, and transmit the streaming audio wirelessly to hearing assistance devices (such as hearing assistance devices 1080-1090). For example, the streaming transmitter 1040 may convert analog audio to digital (if necessary), packetize the audio, compress the audio, or the like. For convenience of description, any device capable of streaming to a hearing assistance device may be described as a streaming audio source. Thus devices 1010, 1020 are streaming audio sources, and the combination of devices 1030 and 1040 provides a streaming audio source.

In some examples, the streaming audio may be broadcast, multicast, unicast, or the like. In examples in which the streaming audio is broadcast, it may be received by any number of hearing assistance devices within range of the wireless transmission in addition to hearing assistance devices 1080 and 1090. In examples in which the streaming audio is multicast or unicast, hearing assistance devices (e.g., hearing assistance devices 1080 and 1090) may register to receive the transmissions from the devices 1010-1040. The streaming audio may be stereo streaming audio with a channel for a right hearing assistance device and a left hearing assistance device.

Hearing assistance devices 1080 and 1090 may be a pair of hearing assistance devices for user 1100. In some examples, hearing assistance devices 1080 and 1090 may communicate with each other wirelessly. Streaming audio received by hearing assistance devices 1080 and 1090 from one or more of the devices 1010-1040 may be played through the speaker (or other audio reproduction techniques, such as cochlear stimulation) in the hearing assistance devices 1080 and 1090. In some examples, only one streaming source may be received and played through the speaker, but in other examples, a variety of different streaming sources may be simultaneously received and blended by onboard processing of the hearing assistance devices 1080-1090. System 1000 may allow users 1100 of hearing assistance devices 1080-1090 to better hear a television, a phone call, music, videos, and the like, which may increase the quality and enjoyment of their lives.

While system 1000 offers great potential to improve the quality of life for users such as user 1100, the wireless links used by these devices often suffer from relatively low range. To increase the range, one possible solution is to simply increase the transmission power of the streaming source. While this will increase the range, a side effect of this is that the streaming link will have significant and periodic drop outs due to radio frequency multipath issues. Multipath is a radio wave propagation phenomenon that results in multiple radio signals from the same transmission reaching the receiver by two or more paths and at two or more times. In some instances, multipath effects cause destructive interference and ultimately fading and degradation of the streaming audio signal.

Disclosed in some examples are methods, systems, apparatus, and machine readable mediums which mitigate multipath fading and extend the robustness and the useable range of the wireless link between a streaming device and one or more hearing assistance devices. In some examples, this may be accomplished by sending multiple copies of the streaming audio to the hearing assistance devices. To prevent interference between each copy, at least one transmission parameter may be varied between the various transmissions of the streaming audio (e.g., frequency, channel, time, coding, or the like).

For example, the streaming transmitter may transmit the same streaming audio on two or more different wireless channels. The hearing assistance devices may choose the channel that allows for the best reception of the streaming audio. In other examples, the hearing assistance devices may cooperate amongst themselves to ensure proper reception. For example, one hearing assistance devices of a pair may wirelessly transmit correctly received streaming audio to a second hearing assistance device of the pair if the second hearing assistance device did not properly receive the streaming audio.

Dual Source Redundancy

Figure 2:
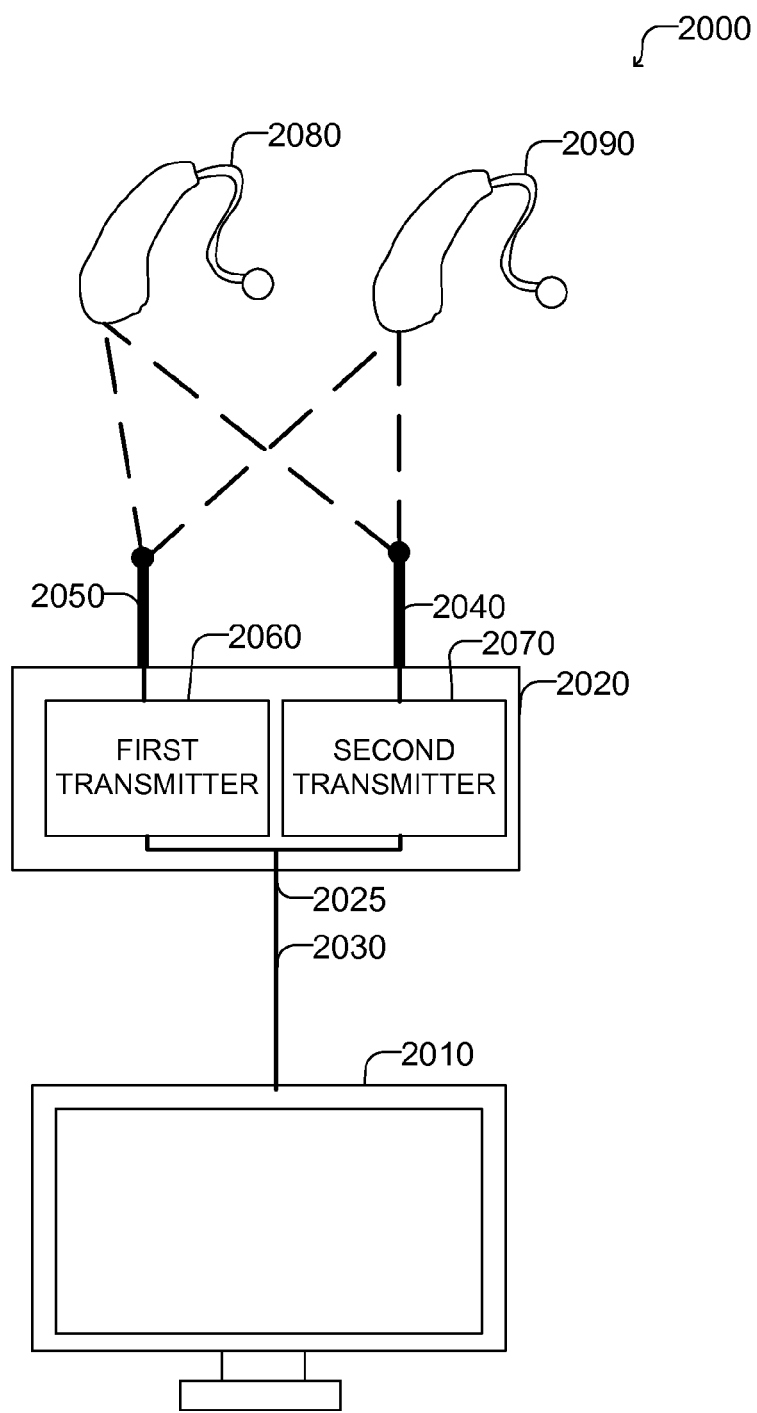
FIG. 2 shows an example schematic of a dual transmission streaming audio system according to some examples of the present disclosure.

In a first example, two or more transmitters at the streaming source may be utilized, each transmitter may transmit identical streaming audio content, but using different wireless transmission parameters (e.g., frequency, channel, timeslot, DSS code, antenna polarization, or the like) to form a different wireless link. FIG. 2 shows an example schematic of a dual transmission streaming audio system 2000 according to some examples of the present disclosure. In FIG. 2 an audio source 2010 (e.g., a television) is connected to streaming transmitter 2020 using link 2030 to form a streaming audio source. Link 2030 may be any wired or wireless link which is capable of conveying streaming audio to streaming transmitter 2020. While a separate streaming transmitters may be shown in the Figures, it will be understood by one of ordinary skill in the art with the benefit of Applicants' disclosure that the functionality described for the streaming transmitters shown in the Figures (e.g., streaming transmitters 1040, 2020, and 3020) may be part of the audio source (e.g., 2010 of FIG. 2, 1010-1030 of FIG. 1, 3010 of FIG. 3).

Streaming transmitter 2020 may have circuitry that allows for transmission of the same audio information conveyed through link 2030 in a redundant fashion. For example, streaming transmitter 2020 may have a first and a second transmitter circuitry 2060 and 2070. In some examples, two antennas may be utilized, first antenna 2050 and second antenna 2040. First and second transmitters 2060 and 2070 may transmit the same streaming audio information conveyed through link 2030 over wireless links to one or more hearing assistance devices 2080 and 2090. Streaming audio conveyed through link 2030 may enter the streaming device at audio input port 2025. Audio input port 2025 may connect streaming transmitter to the audio source via analog or digital connections, and may include physical connectors and other hardware to perform this task. Example connections include HDMI connections, S/PDIF connections, TOSLINK connections, Radio Corporation of America (RCA) connections, phone connections (e.g., stereo plug, mini-jack, mini-stereo connection), and the like. Audio input port 2025 may also include circuitry to manage one or more communication protocols (either wired or wireless) with the streaming audio sources. For example, circuitry to manage the HDMI protocols, S/PDIF protocols, Toslink protocols and the like. Audio input port 2025 may allow for the transmission of streaming audio to the first and second transmitter circuitry 2060 and 2070. Audio input port 2025 may also include circuitry for converting analog streaming audio to digital streaming audio for transmission.

Hearing assistance devices 2080 and 2090 may be a left and a right hearing aid for the same wearer. In other examples, hearing assistance devices 2080 and 2090 may be for different wearers. Any number of hearing assistance devices 2080 and 2090 may receive the streaming transmissions as the wireless links may be broadcast.

While the streaming transmitter 2020 shown in FIG. 2 includes two different transmitter circuits 2060 and 2070, in other examples, the system may utilize two different streaming transmitters, each with a single transmitter circuit. The link 2030 may be split to carry the audio to each of the separate streaming transmitters. It will be appreciated that other various combinations of streaming transmitters and transmitter circuits are contemplated. In other examples, a single transmitter circuit may provide both signals to antennas 2040 and 2050. Additionally, while FIG. 2 shows two different wireless links, additional links may be utilized.

In some examples, each transmitter 2060 and 2070 may transmit the streaming audio on a different wireless channel. A wireless channel may be defined as a specific radio frequency band, or pair of radio frequency bands (e.g., oftentimes paired as an uplink and downlink band). As an example, a Wireless Fidelity (WiFi) network operating according to an 802.11n family of standards promulgated by the Institute for Electrical and Electronics Engineers (IEEE) has channels that have frequency bands of 20 or 40 MHz in width. For example, transmitter 2060 may transmit the streaming audio from source 2010 on channel 1 and transmitter 2070 may transmit the streaming audio from source 2010 on channel 2.

Hearing assistance devices 2080 and 2090 may receive each channel with slightly different signal qualities due to differing multipath effects on each channel. This is due to the differences in frequencies of the channels (different frequencies have different multipath effects), the differing physical locations of the hearing assistance devices, and the spatial diversity gained by antennas 2040 and 2050 being spatially separated. Each hearing assistance device 2080 and 2090 may choose the channel that offers the best reception for that particular device. This choice may be based on one or more signal quality metrics. For example, a Received Signal Strength Indicator (RSSI), a Signal to Noise ratio (SiNR) or the like.

In some examples, the hearing assistance devices 2080 and 2090 may switch channels dynamically as streaming audio is being received if necessary to improve reception. Thus, for example, hearing assistance device 2080 may initially receive the transmission from first transmitter 2060, but then switch to receiving the transmission from the second transmitter 2070 during reception of the streaming audio. In some examples, to trigger this switch, the hearing assistance devices 2080 and 2090 may compare one or more signal quality metrics of the channel which is currently being received with one or more signal quality metrics of the other channels which are broadcasting the streaming audio. The signal quality metrics of other channels may be measured by the hearing assistance devices 2080 and 2090 periodically. In other examples, the hearing assistance devices 2080-2090 may measure the signal quality metrics of other transmissions in response to the signal quality metrics of the currently received streaming audio falling below a predetermined threshold.

Changing channels may allow for continued error-free streaming if either the hearing assistance devices 2080 and 2090 or the streaming transmitter 2020 is moving or the wireless conditions change (e.g., a device nearby may begin operation which may interfere with one of the channels).

While the streaming transmitter 2020 utilizes two antennas in FIG. 2 in an effort to utilize spatial diversity to change the multipath characteristics of the signal, both wireless links could be transmitted from the same antenna. While the spatial diversity benefits may no longer apply, this system may still be effective at countering multipath effects as different frequencies typically have different multipath profiles.

In other examples, instead of two transmitters 2060 and 2070 transmitting on different channels, transmitters 2060 and 2070 may transmit on the same channel, but the two transmissions may be separated by a controlled and small frequency difference. For example, one transmission may be −50 Hz from the center frequency of the channel and the other transmission may be +50 Hz from the center frequency of the channel, leading to a total of 100 Hz separation. Alternately, one or more transmitters may transmit multiple signals on exactly the same frequency (e.g. using a GPS frequency reference, or ultra-stable reference oscillator for the frequency synthesizer) using spatially separated antennas. Normally this may lead to interference, however, since both of transmissions are of the same data, what may happen is that one of the transmissions may fill in for the other transmission in locations where the second transmitter has a multipath null (and vice versa). For example, if one hearing assistance device happened to be located at a multipath null for the first transmitter 2060, it would be statistically unlikely that the second transmitter 2070 would also simultaneously be at a multipath null at that same hearing assistance device (e.g., hearing assistance devices 2080 or 2090) location.

At worst, the redundant transmissions may create a "beat tone" (in some examples, this may be done intentionally. For example, when the two transmissions are spaced 100 Hz apart) amplitude envelope on the received signal. The detrimental effects of this beat tone could be minimized. In some examples, the beat tone could be optimized for the protocol to allow the streaming information to be communicated during each peak of the amplitude envelope. This could be done by ensuring the protocol allows a transmit frame to occur wholly between the beat-tone (e.g. able to be within temporal peaks in the envelope). The length of the TX frame and the beat-tone period (inverse of the frequency difference between the two transmitters) could be non-synchronously/harmonically related, to ensure that redundant packets have at least one valid reception.

In this scenario, it would be highly unlikely to have a multipath null for both transmitters due to the fact that the hearing assistance devices at any location would be relatively near a transmitter and thus have a strong signal. Additionally, any artificially created multipath from two transmitters on exactly the same frequency, would be very short in duration (propagation theory shows that the steeper the null, the less time the null will exist. Thus the stronger the nulling signals, the arbitrarily shorter the temporal duration of the null). This multipath "artifact" from simultaneous same-frequency, multiple transmitter/antenna propagation may be designed to be short enough to be able to be mitigated by forward error correction (FEC), or error concealment techniques for streaming audio.

In yet other examples, the two transmitters may transmit on the same channel, but may utilize a different orthogonal encoding (e.g., as in Direct Sequence Spread Spectrum (DSSS) systems). The codes for both redundant streams may be known to hearing assistant devices 2080 and 2090. The hearing assistance device may choose the stream that has the best quality by switching the codes used to decode the signals. Since the transmissions are separated by the distance between the antennas 2040 and 2050, each signal will have a different multipath propagation pattern. One signal may have better reception at hearing assistance device 2080 than hearing assistance device 2090 and vice versa. In some examples, the hearing assistance devices may be powerful enough to decode both streams simultaneously. This may allow for the hearing assistance devices to determine which stream to utilize on a packet-by-packet basis. In some examples, this concept may use a narrower bandwidth than used on a typical DSSS system. Spatial diversity achieved through use of two antennas may combat multipath effects. Alternatively, a more typical DSSS spread spectrum transmission may be utilized where the signal is spread across a wider bandwidth than other non-DSSS systems. By spreading the signal across a range of frequencies, the effects of multipath in these examples are naturally mitigated. In these examples, only one transmission location (e.g., one antenna) may be necessary.

In still other examples, the system may utilize a time-division scheme where the first transmitter 2060 may transmit the streaming information in a first timeslot and the second transmitter 2070 may transmit the streaming information in a second timeslot. Again, the different transmissions may have different reception quality on the hearing assistance devices (e.g., hearing assistance device 2080 and 2090) because of the slightly different positioning on the antennas. The hearing assistance device may choose the stream that has the best quality by switching the timeslots on which the hearing assistance devices listen in on.

As already noted, while the streaming transmitter unit 2020 in FIG. 2 was shown with two transmitter units 2060 and 2070, in other examples, two different streaming transmitter units may be utilized, each with one or more transmitter circuits. The audio output 2030 may be split to each of the different streaming transmitter units. Coaxial or other cable may be utilized to allow placement of the streaming transmitter units at various coverage locations.

In some examples, in addition to, or instead of, the previously described methods, multipath may also be mitigated by having antennas 2040 and 2050 cross-polarized (e.g., horizontal and vertical polarizations). The signals from cross polarized antennas 2040 and 2050 may propagate differently and produce different multipath. In some examples, these polarization enhancements may be utilized alone, that is, each transmitter will send the same streaming audio to hearing assistance devices 2080 and 2090 on the same channel, frequency, DSS code, and the like, with the only difference being the polarization differences between antenna 2040 and 2050. In other examples, these polarization enhancements may be utilized in addition to the techniques mentioned above. For example, first transmitter 2060 may broadcast on a different channel than second transmitter 2070 and the signal broadcast by antenna 2050 may be cross polarized with the signal transmitted by second transmitter 2070. In these examples, the antenna polarization may be considered one component in the definition of a wireless link.

Ear to Ear Redundancy Streaming

In other examples, instead of, or in addition to providing multiple redundant transmissions from the streaming source, the system may utilize communications between two different hearing assistance devices to provide redundancy. In these examples, the differing locations of the receiving antennae (one for each ear) may provide different reception characteristics of a received streaming audio channel. If, for example, the right hearing assistance device receives the channel better than the left hearing assistance device, the right hearing assistance device may retransmit the streaming audio to the left hearing assistance device using ear-to-ear communications. In some examples, this could be done in stereo, with each hearing aid receiving both the left and the right audio and only retransmitting the audio the other hearing aid would be interested in receiving (e.g., the right hearing aid would retransmit only the left audio information and vice versa).

Figure 3:
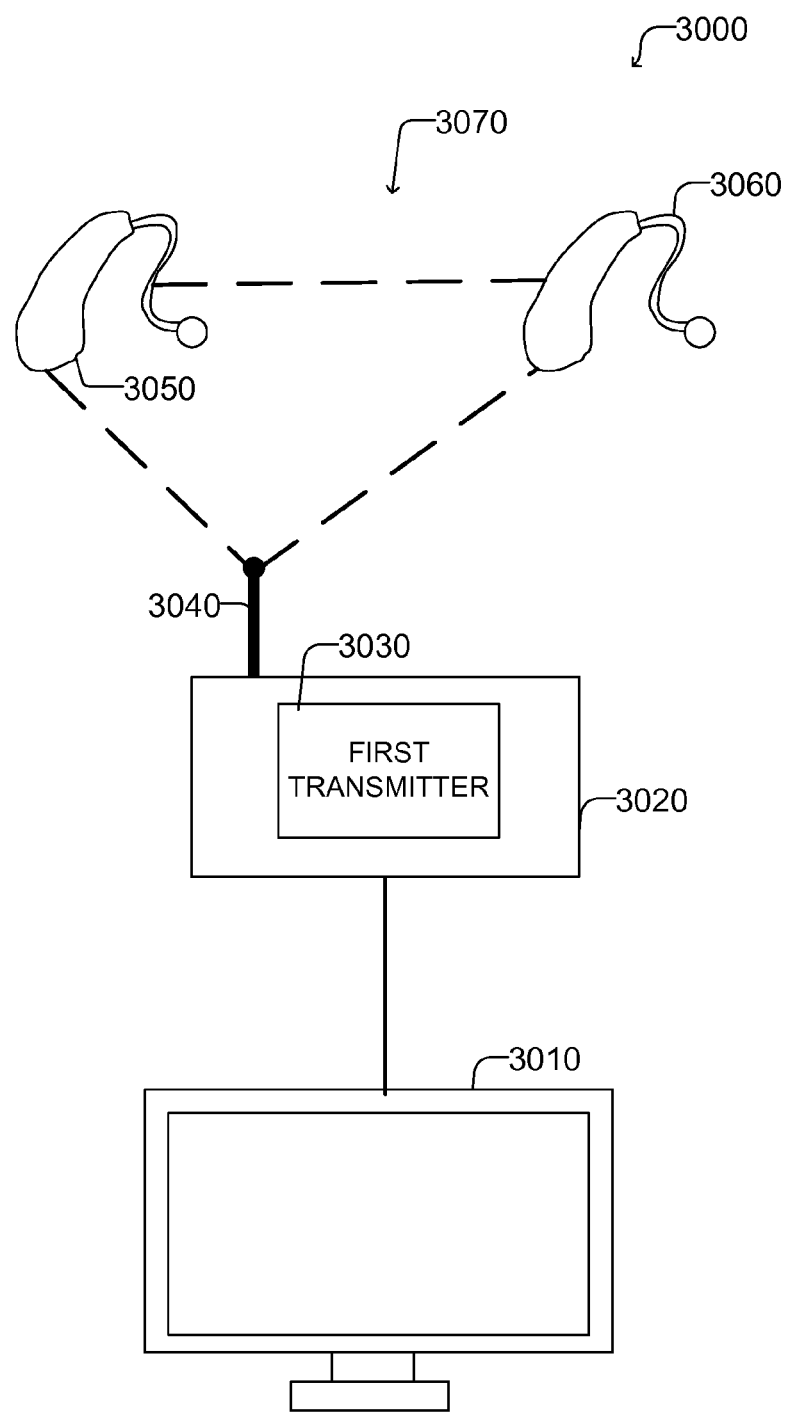
FIG. 3 shows an example schematic of an ear-to-ear redundant streaming system according to some examples of the present disclosure.

FIG. 3 shows an example schematic of an ear-to-ear redundant streaming system 3000 according to some examples of the present disclosure. Audio source 3010 (shown as a television) may provide streaming audio to streaming transmitter 3020. Streaming transmitter 3020 may have transmission circuitry 3030 which transmits the streaming audio using antenna 3040 to one or more hearing assistance devices 3050 and 3060. Hearing assistance devices 3050 and 3060 may be left and right hearing assistance devices for use on a single user. Hearing assistance devices 3050 and 3060 may communicate with each other using wireless ear-to-ear communications. Ear-to-ear communications 3070 may utilize the same wireless protocol utilized by transmitter 3030 to transmit the streaming audio information, or may utilize a different wireless protocol.

In some examples, these solutions may utilize a time division scheme to transmit the different audio streams (e.g., the initial transmission(s) and the ear-to-ear retransmissions). For example, the streaming transmitter 3020 may broadcast a single stream on a first timeslot. The left and right hearing assistance devices 3050 and 3060 may both receive this stream. A right hearing instrument 3060 may receive the stream and rebroadcast it on a second timeslot. A left hearing instrument 3050 may receive the stream and rebroadcast it on a third timeslot. The right hearing instrument 3060 may compare signal quality metrics for the stream received on the first and the third timeslots (e.g., compare the originally received stream with the retransmission received from the left hearing instrument 3050) and pick the stream (e.g., use the audio from the stream) which has the best signal quality. Similarly, the left hearing instrument 3050 may compare signal quality metrics for the stream received on the first and the second timeslots (e.g., compare the originally received stream with the retransmission received from the right hearing instrument 3060) and pick the stream which has the best signal quality. These decisions may be done dynamically on a packet-by-packet basis, periodically (e.g., every 10 ms, 20 ms, or the like), or may be re-evaluated only if signal quality metrics on the chosen timeslot diminishes past a threshold point. In some examples the decisions may be made based upon multiple factors (e.g., periodically, and in response to an event such as signal quality degrading past a threshold).

In yet other examples, only two timeslots may be utilized. The first timeslot would be for receiving the streaming audio at the hearing assistance devices 3050 and 3060 and the second timeslot would be utilized by both the left and right hearing assistance devices 3050 and 3060 to retransmit the received streaming audio. The left and/or right hearing assistance devices 3050 and 3060 would transmit to the other hearing assistance device the received streaming audio only if it was successfully decoded and the signal quality metrics of the received audio were above a predetermined threshold. Thus, if the audio was not successfully decoded or was of poor quality on a first hearing assistance device, the first hearing assistance device would not transmit it to the other hearing assistance device. Instead, the first hearing assistance device would listen for the audio from the second hearing assistance device (who presumably decoded it properly). If both properly decode it, then both transmit it (the dual transmission will interfere, but since it was properly decoded in the first place by both hearing assistance devices, this does not matter).

In some examples, the ear-to-ear transmissions may be turned on and off by the hearing assistance devices. For example, if the signal quality metrics of the streaming audio received by the left and right hearing assistance devices are above a predetermined threshold, the ear-to-ear communications may not be utilized. If the signal quality of streaming audio received by the left or the right hearing assistance device falls below a predetermined threshold, the hearing assistance devices may engage in signaling to begin the ear-to-ear retransmissions. This selective ear-to-ear retransmission may increase battery life by retransmitting only when necessary.

While hearing assistance devices 3050 and 3060 are described as left and right hearing assistance devices, hearing assistance devices 3050 and 3060 may be worn by different persons. For example, hearing assistance devices 3050 and 3060 may be from different persons and may negotiate with each other to provide redundant streaming audio links. In this way, a mesh-network of hearing assistance devices may be formed which may share streamed audio and/or other information.

In other examples, rather than use a time division scheme, the ear-to-ear redundancy may utilize a orthogonal coding scheme, for example, each hearing assistance device 3050 and 3060 could utilize a different orthogonal code for the ear to ear communication link 3060 (e.g., as in direct sequence spread spectrum DSSS). Note that the transmission on the ear to ear link may be slightly delayed by processing and retransmission delays. In some examples, the hearing assistance device may be able to simultaneously decode both orthogonal codes, which allows the hearing assistance device to continuously, on a packet-by-packet basis, select the best transmission source.

In still other examples, the ear-to-ear redundancy may utilize different channels, for example, each hearing assistance device 3050 and 3060 could utilize a different wireless channel for the ear to ear communication link 3060. Note that the transmission on the ear to ear link may be slightly delayed by processing and retransmission delays.

Figure 4:
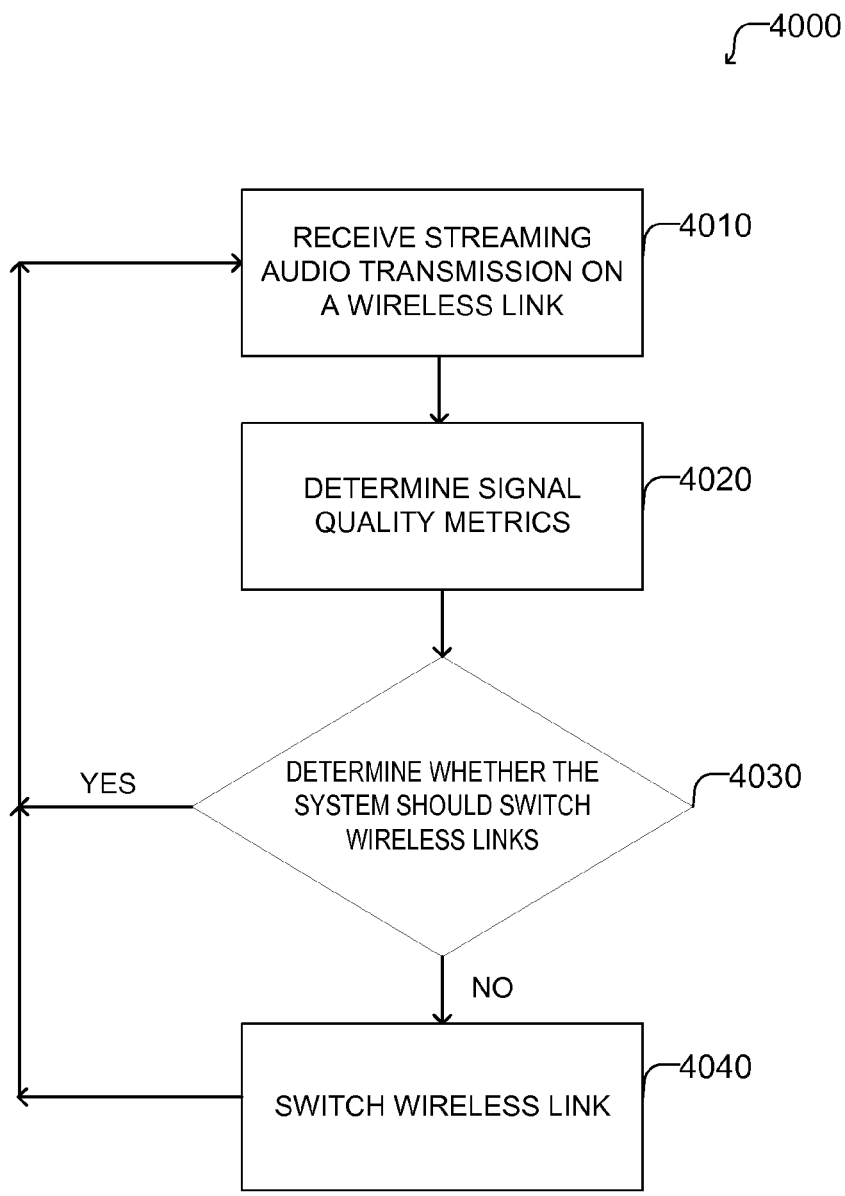
FIG. 4 shows an example flowchart of a method of a hearing assistance device receiving streaming audio according to some examples of the present disclosure is shown.

Turning now to FIG. 4, an example flowchart of a method 4000 of a hearing assistance device receiving streaming audio according to some examples of the present disclosure is shown. At operation 4010 the hearing assistance device may receive a streaming audio transmission from a streaming source on a wireless link. A wireless link may be defined by a number of wireless characteristics, such as frequency, time (e.g., a timeslot), orthogonal code, and streaming source. For example, the hearing assistance device may switch to a second stream broadcast by a streaming source on a different channel.

At operation 4020, the hearing assistance device may determine one or more signal quality metrics of the currently received wireless link, one or more alternative wireless links, or both the currently received wireless link and the one or more alternative wireless links. The signal quality metrics include a measure of how many decoding errors of the streaming audio have occurred recently, a received signal strength (RSSI), a data rate (typically the lower the signal quality the lower the data rate that may be sent), a jitter rate, a latency, or the like. The signal quality metrics may be evaluated constantly (e.g., as an inherent function of receiving the wireless transmissions), periodically, or in response to an event (e.g., when the quality of the current wireless link drops below a threshold). In some examples, the signal quality metrics for the currently received wireless link and the one or more alternative wireless links may be evaluated at different times.

If at operation 4030 the signal quality metrics are adequate, or there are no better alternative wireless links, then the hearing assistance device continues to receive streaming audio on the same wireless link at operation 4010. In contrast, if at operation 4030 it is determined that the system should switch wireless links, the system may do so at operation 4040. In some examples, the system may switch wireless links if the signal quality metrics indicates an alternative wireless link may provide better signal quality. To prevent constant switching amongst two channels that are similar in signal quality a predetermined threshold may be utilized such that the alternative wireless link may have to be better than the current wireless link by the amount of the predetermined threshold.

Switching wireless links at operation 4040 may include switching to an alternative frequency, listening in at a different timeslot, utilizing a different orthogonal code, or the like. In other examples, the hearing assistance device may switch to receiving the streaming audio from a second hearing assistance device (e.g., the other hearing assistance device in a pair of hearing assistance devices).

Once the link has been switched, the system begins to receive the streaming audio transmission (on the new wireless link) at operation 4010. The system may continue to monitor the signal quality metrics at operations 4020 and make changes as necessary at operations 4030 and operations 4040 throughout the reception of the streaming audio.

Figure 5:
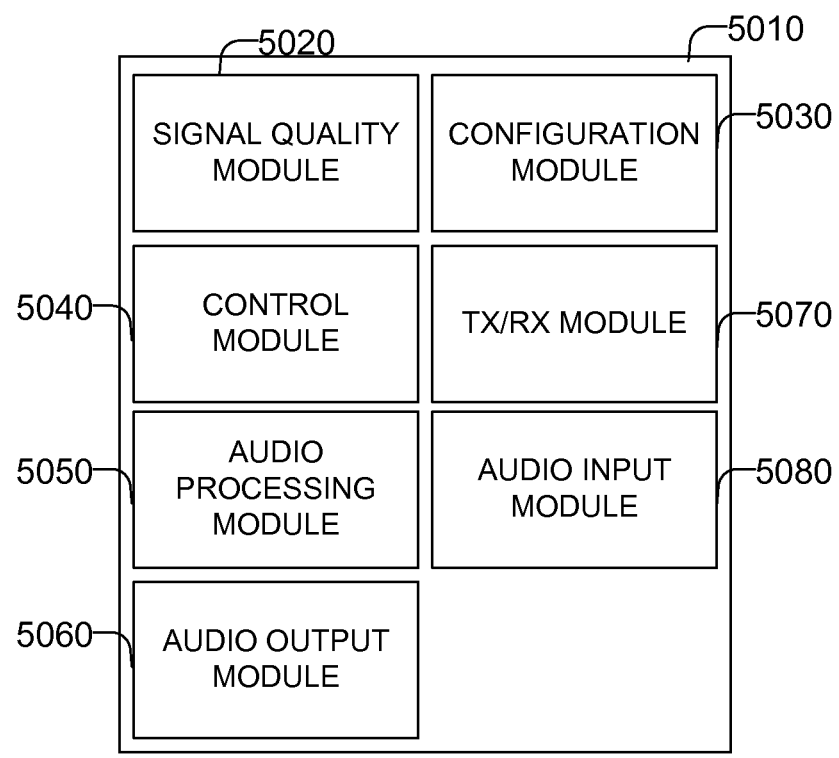
FIG. 5 shows a logical schematic of a hearing assistance device according to some examples of the present disclosure.

FIG. 5 shows an example logical schematic of a portion of hearing assistance device 5010 according to some examples of the present disclosure. Hearing assistance device may include a signal quality module 5020. Signal quality module may assess the signal quality of one or more wireless links. The signal quality metrics include one or more of: a measure of how many decoding errors of the streaming audio have occurred, a received signal strength (RSSI), a data rate (typically the lower the signal quality the lower the data rate that may be sent), a jitter rate, a latency, or the like. The signal quality metrics may be evaluated constantly (e.g., as an inherent function of receiving the wireless transmissions), or periodically. The signal quality module 5020 may evaluate the wireless link on which streaming audio is currently being received, one or more alternative wireless links, or both the current wireless link and the one or more alternative wireless links.

Configuration module 5030 may interface with programming devices (e.g., fitting devices) which may setup hearing assistance device 5010 or change various parameters such as various signal processing parameters which tune the device to compensate for a particular wearer's hearing loss. Other parameters may include setting or changing the various signal quality thresholds which may prompt hearing assistance device 5010 to switch to a different wireless link to receive streaming information. Still more parameters may include information on available wireless links—for example, the programming procedure may pair the hearing assistance device with one or more streaming sources. Pairing is a process in which the hearing assistance devices and one or more streaming sources are configured to properly communicate over one or more wireless links. Pairing may configure parameters such as security settings, frequencies, protocol versions, channel bandwidth parameters, orthogonal codes, timeslots, and the like.

While the configuration module 5030 may allow the hearing assistance devices to be pre-programmed with many of the streaming source's transmissions, in other examples, these parameters may be discoverable at use time. For example, the hearing aids and the streaming sources may pair at a later time. In other examples, the streaming sources may select their own channels that are frequency diverse. Each unit could send out advertisements on a special discovery channel periodically. The hearing assistance devices may determine the transmission parameters based upon these advertisements. The rates at which the streaming sources transmit their announcements may be coordinated amongst all available streaming sources and wireless links to prevent any overlap.

Transmission and reception module (TX/RX Module) 5070 may transmit and receive signals over one or more wireless links according to one or more defined wireless protocols. Example wireless protocols may include protocols operating according to an 802.11 family of standards (e.g., Wireless Fidelity (WiFi)), a Bluetooth family of standards (e.g., Bluetooth Low Energy), a Shockburst family of standards (such as that developed by Nordic Semiconductor), a Long Term Evolution (LTE) family of standards or the like.

Transmission and reception module 5070 may receive the streaming audio from the streaming transmitter and pass the streaming audio to control module 5040 for processing. Transmission and reception module 5070 may also interface with signal quality module 5020 to allow signal quality module 5020 to assess the signal quality metrics of the wireless link. Control module 5040 may interface with the signal quality module 5020, configuration module 5030, and transmission and reception module 5070 to initiate streaming audio reception, chose a wireless link, determine whether the signal quality metrics indicate that the hearing assistance device should try a different wireless link, and responsive to determining that the signal quality metrics indicate that the hearing assistance device should try a different wireless link, instructing the transmission and reception module 5070 to switch to a different wireless link and begin receiving the streaming audio on the different wireless link. In addition, in examples in which multiple wireless links may be received at the same time, the control module 5040, the transmission and reception module 5070, or both may determine which streaming audio packet is sent to the audio output module 5060.

Audio input module 5080 may input audio from a microphone or other audio input source. The audio may be processed by control module 5040 and output by the audio output module 5060. The processing may be tailored such that it compensates for the specific hearing deficiencies of the wearer. For example, certain audio frequency ranges may be amplified, certain audio frequency ranges may be left alone, and certain audio frequency ranges may have the volume lowered.

Audio output module 5060 may output audio received from control module 5040, audio input module 5080, transmission and reception module 5070, or all three. The audio may be processed first by control module 5040. Such processing may include amplification of certain frequency bands, blending of multiple audio sources (e.g., one or more streaming audio sources and audio from audio input module 5080 (e.g., a microphone)) and the like. The processing may be applied to both the audio received from the audio input module 5080 and the streaming audio. The processing may be customized based upon the audio source. Thus streaming audio may also be processed to compensate for a wearer's individualized hearing loss.

While in some of the examples described above, two different wireless links were described, one of ordinary skill in the art with the benefit of Applicants' disclosure will appreciate that more than two wireless streams may be utilized in a similar fashion as described herein.

Figure 6:
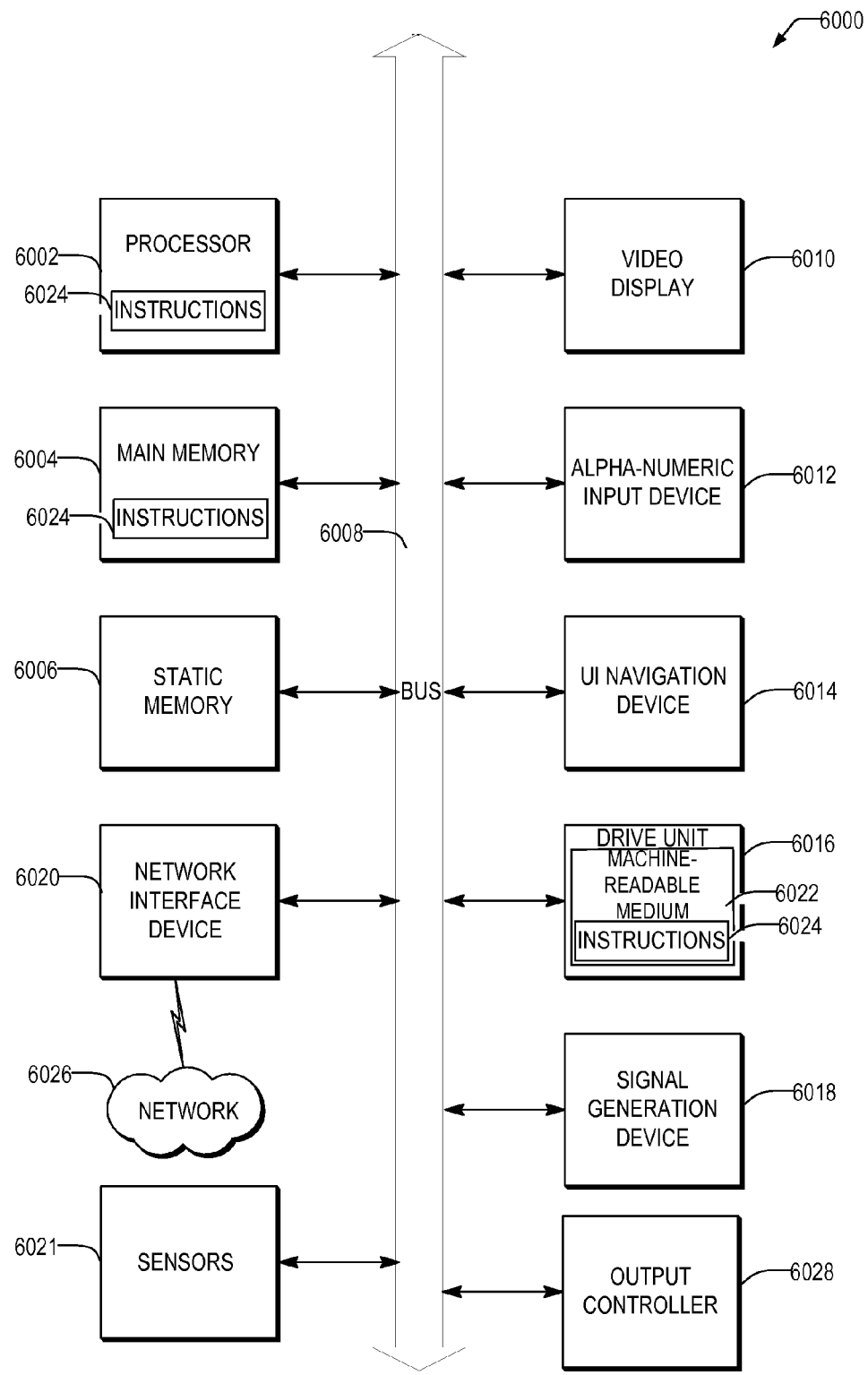
FIG. 6 shows a block diagram of an example machine upon which any one or more of the techniques discussed herein may be performed according to some examples of the present disclosure.

FIG. 6 illustrates a block diagram of an example machine 6000 upon which any one or more of the techniques (e.g., methodologies) discussed herein may be performed. In alternative embodiments, the machine 6000 may operate as a standalone device or may be connected (e.g., networked) to other machines. In a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may be a hearing assistance device, a streaming audio source (e.g., an audio source, a streaming transmitter, or an audio source with streaming transmission capabilities), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, a Digital Signal Processor (DSP), or any combination thereof), a main memory 6004 and a static memory 6006, some or all of which may communicate with each other via an interlink (e.g., bus) 6008. The machine 6000 may further include a video display 6010, an alphanumeric input device 6012 (e.g., a keyboard), and a user interface (UI) navigation device 6014 (e.g., a mouse). In an example, the video display 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: volatile or non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 6024 may further be transmitted or received over a communications network 6026 using a transmission medium via the network interface device 6020. The machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Bluetooth family of standards, a Long Term Evolution (LTE) family of standards, a Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MIMO), or multiple-input single-output (MISO) techniques. In some examples, the network interface device 6020 may wirelessly communicate using Multiple User MIMO techniques.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in communications protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that, and as already noted, the hearing assistance devices (e.g., hearing aids) referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using sub band processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

Other Notes and Examples

The following is a list of non-limiting example embodiments.

Example 1 includes subject matter (such as a method, means for performing acts, non-transitory machine readable medium including instructions that, when performed by a machine cause the machine to perform acts, or an apparatus configured to perform) for receiving streaming audio at a hearing assistance device comprising: receiving streaming audio from a streaming audio source over a first wireless link; determining that quality metrics corresponding to the first wireless link are below a quality threshold; responsive to determining that the quality metrics corresponding to the first wireless link are below a quality threshold, discontinuing the reception of the streaming audio over the first wireless link and begin reception of the streaming audio over a second wireless link, wherein the streaming audio is simultaneously available on both the first and second wireless links and wherein the streaming audio is stereo audio In example 2, the subject matter of example 1 may optionally include wherein the first wireless link is on a first wireless channel and the second wireless link is on a second wireless channel.

In example 3, the subject matter of any one or more of examples 1-2 may optionally include wherein the streaming audio on the second wireless link is sent by the streaming audio source.

In example 4, the subject matter of any one or more of examples 1-3 may optionally include wherein the first wireless link is on a first wireless timeslot and the second wireless link is on a second wireless timeslot.

In example 5, the subject matter of any one or more of examples 1-4 may optionally include wherein the first wireless link uses a first orthogonal code and the second wireless link uses a second orthogonal code.

In example 6, the subject matter of any one or more of examples 1-5 may optionally include wherein the streaming audio on the second wireless link is sent by a second hearing assistance device.

In example 7, the subject matter of any one or more of examples 1-6 may optionally include playing the streaming audio through a speaker integrated into the hearing assistance device.

In example 8, the subject matter of any one or more of examples 1-7 may optionally include wherein the threshold is a signal quality measured for the second wireless link.

Example 9 includes or may optionally be combined with the subject matter of any one of examples 1-8 to include subject matter (such as a hearing assistance device, an apparatus, a system, or machine) comprising: transmission and reception circuitry configured to: receive streaming audio from a streaming audio source over a first wireless link; determine that quality metrics corresponding to the first wireless link are below a quality threshold; and control circuitry configured to: discontinue receiving the streaming audio over the first wireless link and begin receiving the streaming audio over a second wireless link responsive to a determination that the quality metrics corresponding to the first wireless link are below a quality threshold, wherein the streaming audio is simultaneously available on both the first and second wireless links and wherein the streaming audio is stereo audio.

In example 10, the subject matter of any one or more of examples 1-9 may optionally include wherein the first wireless link is on a first wireless channel and the second wireless link is on a second wireless channel.

In example 11, the subject matter of any one or more of examples 1-10 may optionally include wherein the streaming audio on the second wireless link is sent by the streaming audio source.

In example 12, the subject matter of any one or more of examples 1-11 may optionally include wherein the first wireless link is on a first wireless timeslot and the second wireless link is on a second wireless timeslot.

In example 13, the subject matter of any one or more of examples 1-12 may optionally include wherein the first wireless link uses a first orthogonal code and the second wireless link uses a second orthogonal code.

In example 14, the subject matter of any one or more of examples 1-13 may optionally include wherein the streaming audio on the second wireless link is sent by a second hearing assistance device.

In example 15, the subject matter of any one or more of examples 1-14 may optionally include wherein the control circuitry is configured to: cause the streaming audio to be played through a speaker integrated into the hearing assistance device.

In example 16, the subject matter of any one or more of examples 1-15 may optionally include wherein the threshold is a signal quality measured for the second wireless link.

Example 17 includes or may optionally be combined with the subject matter of any one of examples 1-16 to include subject matter (such as a hearing assistance device, a streaming transmitter, an apparatus, a system, or machine) comprising: a hearing assistance device comprising: transmission and reception circuitry configured to: receive streaming audio from a streaming audio source over a first wireless link; determine that quality metrics corresponding to the first wireless link are below a quality threshold; and control circuitry configured to: discontinue receiving the streaming audio over the first wireless link and begin receiving the streaming audio over a second wireless link responsive to a determination that the quality metrics corresponding to the first wireless link are below a quality threshold; and a streaming transmitter comprising: first and second spatially separated antennae; an audio input port configured to receive the streaming audio; and at least one transmitter configured to simultaneously transmit the streaming audio to the hearing assistance device over the first and second antennae using the first and second wireless links.

In example 18, the subject matter of any one or more of examples 1-17 may optionally include wherein the first wireless link is on a first wireless channel and the second wireless link is on a second wireless channel.

In example 19, the subject matter of any one or more of examples 1-18 may optionally include wherein the first wireless link is on a first wireless timeslot and the second wireless link is on a second wireless timeslot.

In example 20, the subject matter of any one or more of examples 1-19 may optionally include wherein the first wireless link uses a first orthogonal code and the second wireless link uses a second orthogonal code.

In example 21, the subject matter of any one or more of examples 1-20 may optionally include wherein the control circuitry of the hearing assistance device is configured to: cause the streaming audio to be played through a speaker integrated into the hearing assistance device.

In example 22, the subject matter of any one or more of examples 1-21 may optionally include wherein the threshold is a signal quality measured for the second wireless link.

In example 23, the subject matter of any one or more of examples 1-22 may optionally include wherein the first and second antennae are cross polarized.

What is claimed is:
1. A method for receiving streaming audio with a first hearing assistance device from a system including a second hearing assistance device and a streaming audio transmission device, the method comprising:
  at the first hearing assistance device:
    receiving a packet of stereo streaming audio data from a streaming audio transmission device over a first wireless link;
    receiving a second packet of the stereo streaming audio data from a second hearing assistance device over a second wireless link, the second hearing assistance device receiving the packet of stereo streaming audio data from the streaming audio transmission device and retransmitting at least a portion of the stereo streaming audio data in the packet to the first hearing assistance device over the second wireless link as the second packet;

determining a first quality metric for the first wireless link;

determining a second quality metric for the second wireless link;

selecting an output packet based upon the first and second quality metrics, the output packet comprising the first packet if the first quality metric is better than or equal to the second quality metric and the second packet if the second quality metric is better than the first quality metric; and outputting to a speaker of the first hearing assistance device, audio corresponding to the output packet.

2. The method of claim 1, wherein the first wireless link is on a first wireless channel and the second wireless link is on a second wireless channel.

3. The method of claim 1, wherein the first wireless link is on a first wireless timeslot and the second wireless link is on a second wireless timeslot.

4. The method of claim 1, wherein the first wireless link uses a first orthogonal code and the second wireless link uses a second orthogonal code.

5. The method of claim 1, wherein the first quality metric is a signal quality measured for the second wireless link.

6. A non-transitory machine-readable medium, including instructions, which when performed by the machine, causes the machine to perform operations on a first hearing assistance device, for receiving streaming audio from a system including a second hearing assistance device and a streaming audio transmission device, the operations comprising:

at the first hearing assistance device:
receiving a packet of stereo streaming audio data from a streaming audio transmission device over a first wireless link;

receiving a second packet of the stereo streaming audio data from a second hearing assistance device over a second wireless link, the second hearing assistance device receiving the packet of stereo streaming audio data from the streaming audio transmission device and retransmitting at least a portion of the stereo streaming audio data in the packet to the first hearing assistance device over the second wireless link as the second packet;

determining a first quality metric for the first wireless link;

determining a second quality metric for the second wireless link;

selecting an output packet based upon the first and second quality metrics, the output packet comprising the first packet if the first quality metric is better than or equal to the second quality metric and the second packet if the second quality metric is better than the first quality metric; and outputting to a speaker of the first hearing assistance device, audio corresponding to the output packet.

7. The machine-readable medium of claim 6, wherein the first wireless link is on a first wireless channel and the second wireless link is on a second wireless channel.

8. The machine-readable medium of claim 6, wherein the first wireless link is on a first wireless timeslot and the second wireless link is on a second wireless timeslot.

9. The machine-readable medium of claim 6, wherein the first wireless link uses a first orthogonal code and the second wireless link uses a second orthogonal code.

10. The machine-readable medium of claim 6, wherein the first quality metric is a signal quality measured for the second wireless link.

11. A first hearing assistance device for receiving streaming audio from a system including a second hearing assistance device and a streaming audio transmission device, the first hearing assistance device comprising:

transmission and reception circuitry configured to:
receive a packet of stereo streaming audio data from a streaming audio transmission device over a first wireless link;

receive a second packet of the stereo streaming audio data from a second hearing assistance device over a second wireless link, the second hearing assistance device receiving the packet of stereo streaming audio data from the streaming audio transmission device and retransmitting at least a portion of the stereo streaming audio data in the packet to the first hearing assistance device over the second wireless link as the second packet;

control circuitry configured to:
determine a first quality metric for the first wireless link;

determine a second quality metric for the second wireless link;

selecting an output packet based upon the first and second quality metrics, the output packet comprising the first packet if the first quality metric is better than or equal to the second quality metric and the second packet if the second quality metric is better than the first quality metric; and digital to analog conversion circuitry configured to:
output to a speaker of the first hearing assistance device, audio corresponding to the output packet.

12. The hearing assistance device of claim 11, wherein the first wireless link is on a first wireless channel and the second wireless link is on a second wireless channel.

13. The hearing assistance device of claim 11, wherein the first wireless link is on a first wireless timeslot and the second wireless link is on a second wireless timeslot.

14. The hearing assistance device of claim 11, wherein the first wireless link uses a first orthogonal code and the second wireless link uses a second orthogonal code.

15. The hearing assistance device of claim 11, wherein the first quality metric is a signal quality measured for the second wireless link.

16. A system comprising:
a first hearing assistance device comprising:
transmission and reception circuitry configured to:
receive a packet of stereo streaming audio data from a streaming audio transmission device over a first wireless link;

receive a second packet of the stereo streaming audio data from a second hearing assistance device over a second wireless link, the second hearing assistance device receiving the packet of stereo streaming audio data from the streaming audio transmission device and retransmitting at least a portion of the stereo streaming audio data in the packet to the hearing assistance device over the second wireless link as the second packet;

control circuitry configured to:
determine a first quality metric for the first wireless link;

determine a second quality metric for the second wireless link;

selecting an output packet based upon the first and second quality metrics, the output packet comprising the first packet if the first quality metric is better than or equal to the second quality metric and the second packet if the second quality metric is better than the first quality metric;

digital to analog conversion circuitry configured to:
output to a speaker of the first hearing assistance device, audio corresponding to the output packet;

a streaming audio transmission device comprising:
first antennae;
an audio input port configured to receive the streaming audio; and
at least one transmitter configured to transmit the streaming audio to the first hearing assistance device over the first antennae using the first wireless link, wherein the streaming audio is stereo.

17. The system of claim 16, wherein the first wireless link is on a first wireless channel and the second wireless link is on a second wireless channel.

18. The system of claim 16, wherein the first wireless link is on a first wireless timeslot and the second wireless link is on a second wireless timeslot.

19. The system of claim 16, wherein the first wireless link uses a first orthogonal code and the second wireless link uses a second orthogonal code.

20. The system of claim 16, wherein the first quality metric is a signal quality measured for the second wireless link.

21. The method of claim 1, wherein the first hearing assistance device and the second hearing assistance device are for use on a single user.

22. The method of claim 1, wherein the first hearing assistance device is for use on a first user and the second hearing assistance device is for use on a second user.

23. The machine-readable medium of claim 6, wherein the first hearing assistance device and the second hearing assistance device are for use on a single user.

24. The machine-readable medium of claim 6, wherein the first hearing assistance device is for use on a first user and the second hearing assistance device is for use on a second user.

25. The hearing assistance device of claim 11, wherein the first hearing assistance device and the second hearing assistance device are for use on a single user.

26. The hearing assistance device of claim 11, wherein the first hearing assistance device is for use on a first user and the second hearing assistance device is for use on a second user.

27. The system of claim 16, wherein the first hearing assistance device and the second hearing assistance device are for use on a single user.

28. The system of claim 16, wherein the first hearing assistance device is for use on a first user and the second hearing assistance device is for use on a second user.

* * * * *